Nov. 6, 1951  L. P. KUCZYNSKI ET AL  2,574,333
FISH POLE LIGHT ATTACHMENT
Filed May 28, 1947
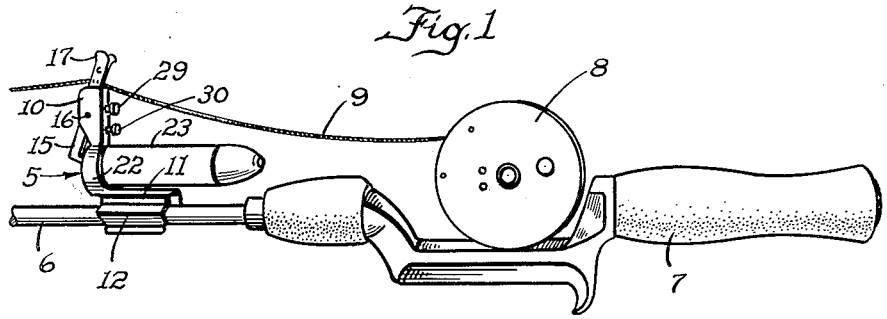
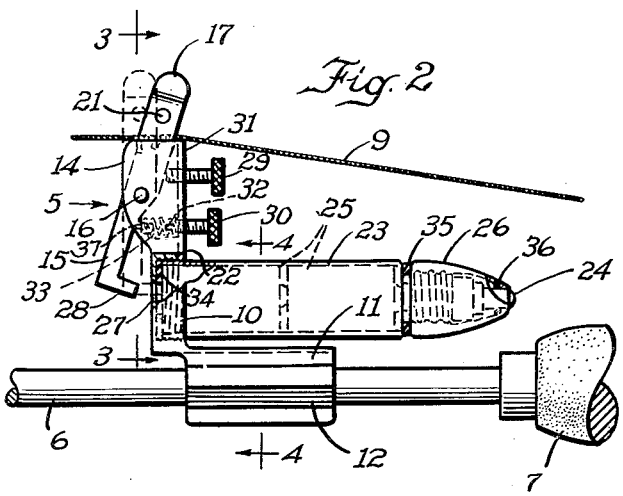
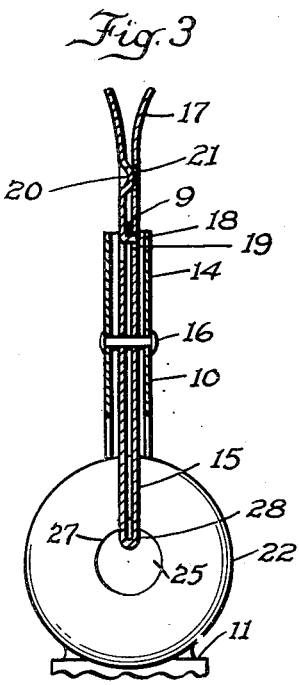
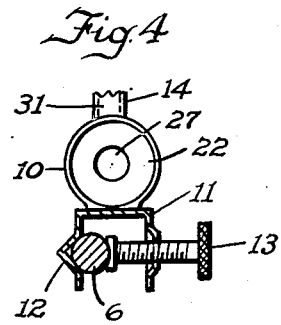
Inventors
Leonard P. Kuczynski
Herbert J. Kuczynski Patented Nov. 6, 1951

2,574,333

UNITED STATES PATENT OFFICE 2,574,333

FISH POLE LIGHT ATTACHMENT

Leonard P. Kuczynski and Herbert J. Kuczynski, Rockford, Ill.

Application May 28, 1947, Serial No. 751,104

10 Claims. (Cl. 43—17)

This invention relates to a new and improved light attachment for fishing poles and rods designed to facilitate and really make it practical and enjoyable to go fishing at night.

The principal object of our invention is to provide an attachment of the kind mentioned which is of simple and economical construction and which, besides serving to flash a signal to indicate when a fish is biting, is designed so that the light can be turned on steadily whenever illumination is needed for other purposes, as when baiting a hook, removing a fish from the hook, untangling a snarled line, or doing any one of the many other things connected with fishing, the performance of which would be difficult, if not entirely impossible, in the dark.

A salient feature of the device of our invention is the provision of a contact arm mounted on the frame of the device for rocking motion and arranged to have the line detachably connected to one end thereof so as to actuate the arm when there is a slight tug on the line, due to a fish biting on the baited hook, the frame of the device having two hand screws adjustably mounted thereon on opposite sides of the pivot for said lever, the one serving when tightened to move the arm to the closed circuit position for steady illumination when that is desired, and the other cooperating with a coiled compression spring that engages the arm to vary the spring resistance to rocking movement, whereby to compensate for drag on the line due to a current under certain fishing conditions to avoid having the light signal flashed promiscuously and haphazardly.

Another feature of the attachment is the provision of a socket in the frame into which the tubular housing of a flashlight assembly may be threaded for support, thus enabling the use of a flashlight assembly of conventional construction available at low cost, the parts of which may also be readily replaced when broken or worn out, the socket being furthermore provided with an opening in the end wall thereof through which a projection on the free end of the contact arm is movable to ground the light bulb for signal or illumination purposes, thereby reducing the attachment to substantially the fewest possible number of working parts.

The invention is illustrated in the accompanying drawing, in which

Fig. 1 is a side view of the handle end of a fishing rod equipped with a light attachment made in accordance with our invention;

Fig. 2 is a side view of the attachment on a larger scale, certain portions being broken away and shown in section to better illustrate the construction;

Fig. 3 is a still further enlarged section on the line 3—3 of Fig. 2, looking in the direction indicated by the arrows, and Fig. 4 is a cross section on the line 4—4 of Fig. 2, looking in the opposite direction, the flashlight assembly being removed from the socket in the frame.

The same reference numerals are applied to corresponding parts throughout the views.

Referring to Fig. 1, the light attachment is indicated generally by the reference numeral 5 as mounted on the rear end portion of the fishing rod 6 near the handle 7 so that the light when turned on steadily, as hereinafter described, will illuminate the reel 8 and the vicinity and enable the fisherman to attend to any backlash condition that might arise or untangle a snarl in the line 9, either of which operations would be difficult, if not entirely impossible, in the dark. This location of the light attachment near the handle is also most convenient for other purposes when the light attachment is being used only for illumination, as when baiting a hook, removing a fish from the hook, or doing any one of the many other things connected with fishing. Of course, this location of the light attachment is also best for signal purposes to let the fisherman know the instant a fish is biting.

The attachment comprises a frame 10 which may be, and preferably is, cast in one piece, the lower portion 11 being forked to straddle the rod 6 and having a trough-shaped portion 12 on one side wall in which the rod 6 may be clamped by means of a screw 13 that is threaded on the other side wall intermediate the ends of the forked portion. The upper end portion 14 of the frame 10 is also forked and has the contact arm 15 pivoted therein intermediate its ends as indicated at 16. This contact arm may be formed from a single piece of spring brass material or the like folded upon itself and having its free end portions curved outwardly away from one another to form the opposite sides of a spring clip 17 into which the line 9 may be entered to be frictionally gripped and thereby operatively connected with the contact arm 15 for actuation of the arm by the line when there is a tug on the line indicating that a fish is biting. A lug 18 is bent from the one side of the clip and entered in a hole 19 in the other side to serve as a stop for the line 9, although the line may, if desired, ride on the upper end of the frame 10. An embossed spherical portion 20 on one side of the clip 17 registers with and enters a hole 21 in the other side to retain the line 9 in the clip against accidental displacement. A screw-threaded socket 22 is provided in the frame 10 between the upper and lower ends thereof and has one end of the tubular housing 23 of a flashlight assembly threaded therein for support of the flashlight in the proper operative relationship to the contact arm 15 for grounding of its light bulb 24 for signal or illumination purposes. The socket 22 is of a size and has threads therein to receive the threaded end of the housing of a conventional "keyhole," purse, or pocket size flashlight, such flashlights being widely available at low cost, so that in the event of damage, breakage, or wearing out of any parts, or when the batteries 25 are used up, it is a simple and inexpensive matter to make replacements. As is well known, the housing 23 of such flashlights contain two batteries 25 and have either a translucent or transparent globe or tip portion 26 threaded on the front end of the housing enclosing the bulb 24, the globe usually having an opening in the outer end through which the tip of the bulb 24 projects, as shown. An opening 27 is provided in the end wall of the socket 22, and there is a projection 28 on the free end of the contact arm 15 arranged to engage the end wall of one of the batteries 25 through this opening to ground the light bulb 24 for signal or illumination purposes. Two hand screws 29 and 30 are threaded in the web portion 31 of the forked upper end portion 14 of the frame, the first of these screws being located above the pivot 16 and being arranged to engage and move the contact arm toward closed circuit position when steady illumination is desired, and the other screw being located below the pivot 16 and having a reduced end portion 32 snugly receiving one end portion of a light coiled compression spring 33, the other end portion of which is engaged on a projection 37 on the contact arm 15 below the pivot 16 to hold the arm normally in an open circuit position and resist movement thereof toward closed circuit position. Obviously adjustment of the screw 30 toward the arm 15 will increase spring pressure and adjustment in the opposite direction will decrease spring pressure on the arm, and in that way the fisherman can by appropriate adjustment of the screw 30 compensate accurately for whatever drag there may be on the line caused by the current under certain fishing conditions and avoid having the light signal flashed haphazardly.

The operation of the device is as follows: The hook can be baited using the light from the attachment 5, the screw 29 being threaded forwardly to hold the contact arm 15 in the closed circuit position against resistance of the spring 33 for as long as the fisherman needs the light. Then, after the baited hook has been cast and the screw 29 is loosened again, the line 9 is inserted in the clip 17 on the arm 15, the operator being sure to have as little slack in the line forwardly from the attachment as possible and being sure that there is ample slack in the line behind the attachment, so that there will be nothing to interfere with the line 9 actuating the contact arm 15 the moment there is a slight tug on the line indicating that a fish is biting. The electrical circuit in this device is similar to that in Simmons et al. Patent No. 2,196,784; a pull on line 9, due to a fish biting, causes oscillation of contact arm 15, whereby to complete a circuit through the light bulb 24 by grounding the batteries 25 on the housing 23. When a fish is caught and the fisherman needs the light to remove the fish from the hook, the screw 29 will again be tightened to hold the contact arm 15 in closed circuit position for as long as illumination is needed. The screw 30 is usually set for light spring tension on the arm 15 but will be adjusted for heavier spring tension to compensate for whatever drag there may be on the line caused by a current under special fishing conditions so that there will be no danger of the light being turned on in a haphazard way.

In conclusion, attention is called to the three rubber gasket rings 34, 35 and 36, the first being seated in the bottom of the socket 22 to provide a seal between the frame 10 and the housing 23 against ingress of water, and the second being provided between the front end of the housing 23 and the screw threaded globe 26 to seal this joint against ingress of water, and the third being provided around the bulb 24 between the bulb and the open end of the globe member 26 to seal this opening and prevent ingress of water. In that way there will be no likelihood of the flashlight assembly being fouled by water and rendered useless for the purposes intended.

It is believed the foregoing description conveys a good understanding of the objects and advantages of our invention. The appended claims have been drawn to cover all legitimate modifications and adaptations.

We claim:

1. In a device of the character described a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, an elongated contact arm pivotally mounted intermediate its ends in the other forked end of said frame and having a projection on one end thereof arranged to engage the exposed end of one of said batteries through the aforesaid opening upon rocking motion of said contact arm, whereby to cause the light bulb to be lighted, spring means on said frame tending normally to urge the arm toward a retracted position relative to said battery, a manually operable means on said frame arranged when operated to move said arm in the opposite direction against the action of said spring means to turn the light on, and means on the other end of said arm for detachably connecting a fishline thereto.

2. In a device of the character described a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, an elongated contact arm pivotally mounted intermediate its ends in the other forked end of said frame and having a projection on one end thereof arranged to engage the exposed end of one of said batteries through the aforesaid opening upon rocking motion of said contact arm, whereby to cause the light bulb to be lighted, a spring mounted on said frame and active against the arm on one side of its pivot to urge the arm normally toward a retracted position relative to the flashlight, a manually operable means on said frame arranged to engage said arm on the opposite side of its pivot and move it in the opposite direction against the resistance of said spring, and means on the other end of said arm for detachably connecting a fishline thereto.

3. In a device of the character described, a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, an elongated contact arm pivotally mounted intermediate its ends in the other forked end of said frame and having a projection on one end thereof arranged to engage the exposed end of one of said batteries through the aforesaid opening upon rocking motion of said contact arm, whereby to cause the light bulb to be lighted, a coiled compression spring engaging said arm on one side of its pivot to urge the arm toward a retracted position relative to the flashlight, a manually adjustable screw on said frame engaging said spring and adjustable to vary the pressure thereof on said arm, a manually adjustable means on said frame arranged to engage said arm on the other side of its pivot to move it in the opposite direction against the resistance of said spring, and means on the other end of said arm for detachably connecting a fishline thereto.

4. In a device of the character described, a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, seal means compressed in said socket by said housing to prevent ingress of water between batteries and housing, an elongated contact arm pivotally mounted intermediate its ends in the other forked end of said frame and having a projection on one end thereof arranged to engage the exposed end of one of said batteries through the aforesaid opening upon rocking motion of said contact arm, whereby to cause the light bulb to be lighted, spring means on said frame tending normally to urge the arm toward a retracted position relative to said battery, a manually operable means on said frame arranged when operated to move said arm in the opposite direction against the action of said spring means to turn the light on, and means on the other end of said arm for detachably connecting a fishline thereto.

5. In a device of the character described, a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, seal means for said flashlight assembly to prevent ingress of water, an elongated contact arm pivotally mounted intermediate its ends in the other forked end of said frame and having a projection on one end thereof arranged to engage the exposed end of one of said batteries through the aforesaid opening upon rocking motion of said contact arm, whereby to cause the light bulb to be lighted, spring means on said frame tending normally to urge the arm toward a retracted position relative to said battery, a manually operable means on said frame arranged when operated to move said arm in the opposite direction against the action of said spring means to turn the light on, and means on the other end of said arm for detachably connecting a fishline thereto.

6. In a device of the character described, a frame of elongated form forked at its opposite ends, the fork at one end being large enough to accommodate a fishing rod and having a means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, and means mounted in the other forked end of said frame and having a projection for engaging a battery through said opening and arranged to be operatively connected with a fishline to light the flashlight bulb when the line is pulled.

7. In a device of the character described, a frame of elongated form which is forked at one end, the fork being large enough to accommodate a fishing rod and having means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, an elongated contact arm pivotally mounted intermediate its ends on the other end of said frame and having a projection on one end thereof arranged to engage the exposed end of one of said batteries through the aforesaid opening upon rocking motion of said contact arm, whereby to cause the light bulb to be lighted, spring means on said frame tending normally to urge the arm toward a retracted position relative to said battery, a manually operable means on said frame arranged when operated to move said arm in the opposite direction against the action of said spring means to turn the light on, and means on the other end of said arm for detachably connecting a fishline thereto.

8. In a device of the character described, a frame having means to secure the same to a fishing rod, said frame having a socket provided therein, a flashlight assembly including a housing mounted in said socket for support, said housing enclosing one or more batteries and supporting an electric light bulb operatively associated with said batteries, said frame having an opening provided therein opening into the inner end of said socket, an elongated contact arm pivotally mounted intermediate its ends on said frame adjacent the socket and having a projection on one end thereof arranged to engage the exposed end of one of said batteries through the aforesaid opening, upon rocking motion of said contact arm, whereby to cause the light bulb to be lighted, spring means on said frame tending normally to urge the arm toward a retracted position relative to said battery, a manually operable means on said frame arranged when operated to move said arm in the opposite direction against the action of said spring means to turn the light on, and means on the other end of said arm for detachably connecting a fishline thereto.

9. In a device of the character described, a frame of elongated form forked at one end, the fork being large enough to accommodate a fishing rod and having means to secure the rod therein, said frame having a socket provided therein intermediate its ends, a flashlight assembly including a housing mounted in said socket for support, said housing enclosing one or more batteries and supporting an electric light bulb operatively associated with said batteries, said frame having an opening provided therein opening into the inner end of said socket, and means mounted on the other end of said frame and having a projection for engaging a battery through said opening and arranged to be operatively connected with a fish line to light the flashlight bulb when the line is pulled.

10. In a device of the character described, a frame having means to secure the same to a fishing rod, said frame having a socket provided therein, a flashlight assembly including a housing mounted in said socket for support, said housing enclosing one or more batteries and supporting an electric light bulb operatively associated with said batteries, said frame having an opening provided therein opening into the inner end of said socket, and means mounted on said frame and having a projection for engaging a battery through said opening and arranged to be operatively connected with a fishline to light the flashlight bulb when the line is pulled.

LEONARD P. KUCZYNSKI.
HERBERT J. KUCZYNSKI.

REFERENCES CITED

The following references are of record in the file of this patent:

UNITED STATES PATENTS

| Number | Name | Date |
|---|---|---|
| 522,352 | Poppowitsch | July 3, 1894 |
| 619,410 | Hendricks | Feb. 14, 1899 |
| 1,337,292 | Timmons | Apr. 20, 1920 |
| 1,705,419 | Rossi | Mar. 12, 1929 |
| 2,196,784 | Simmons et al. | Apr. 9, 1940 |